March 12, 1957  F. R. SWANSON ET AL  2,784,647
BUCKET MILLING MACHINE
Filed May 1, 1953  10 Sheets-Sheet 1
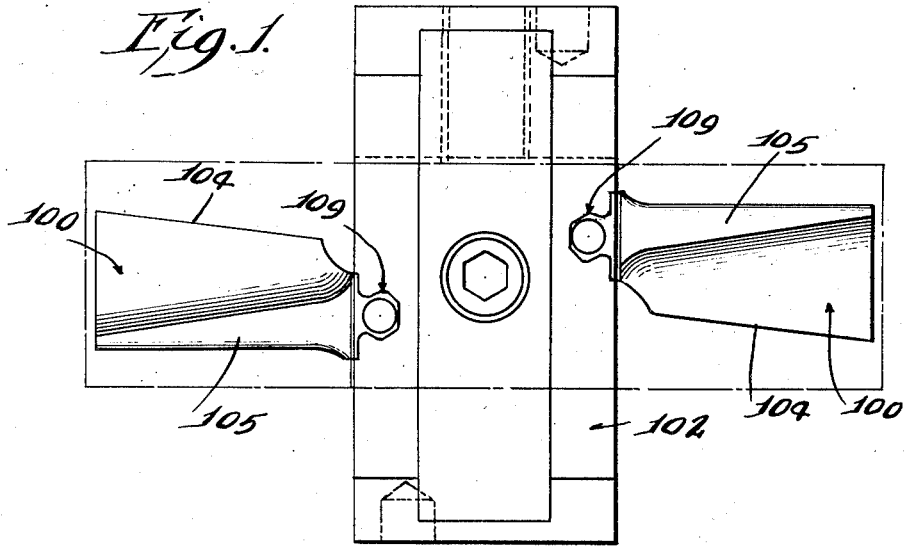
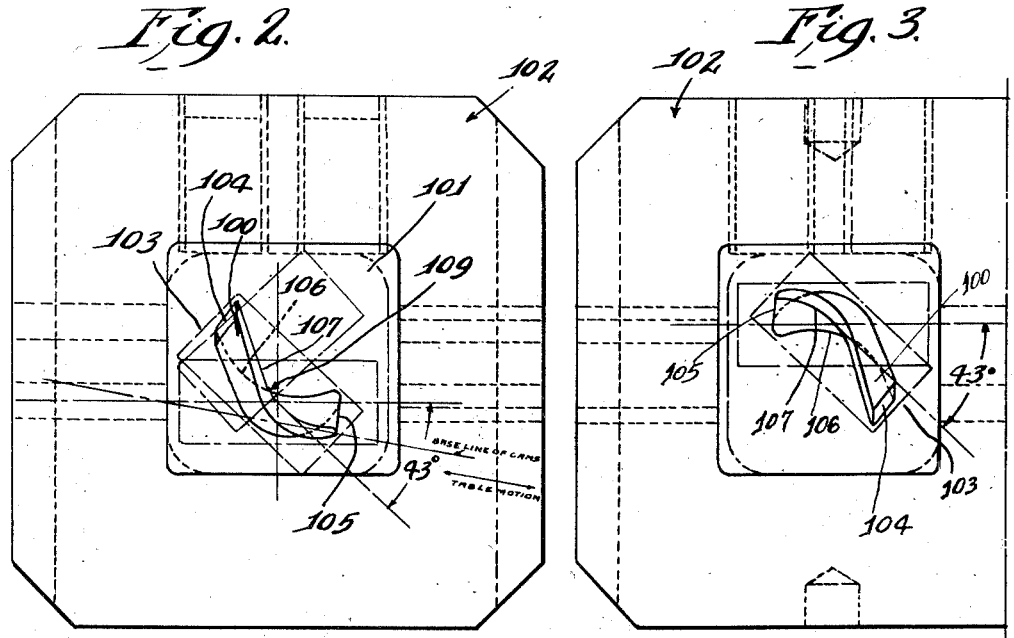
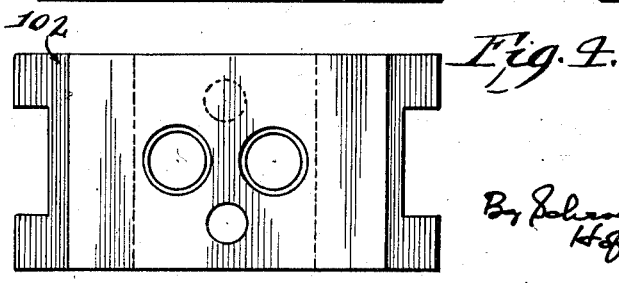
Inventors
Fred R. Swanson
Kenneth H. Hendry
By Schroeder, Merriam, Hofgren & Brady
Att'ys

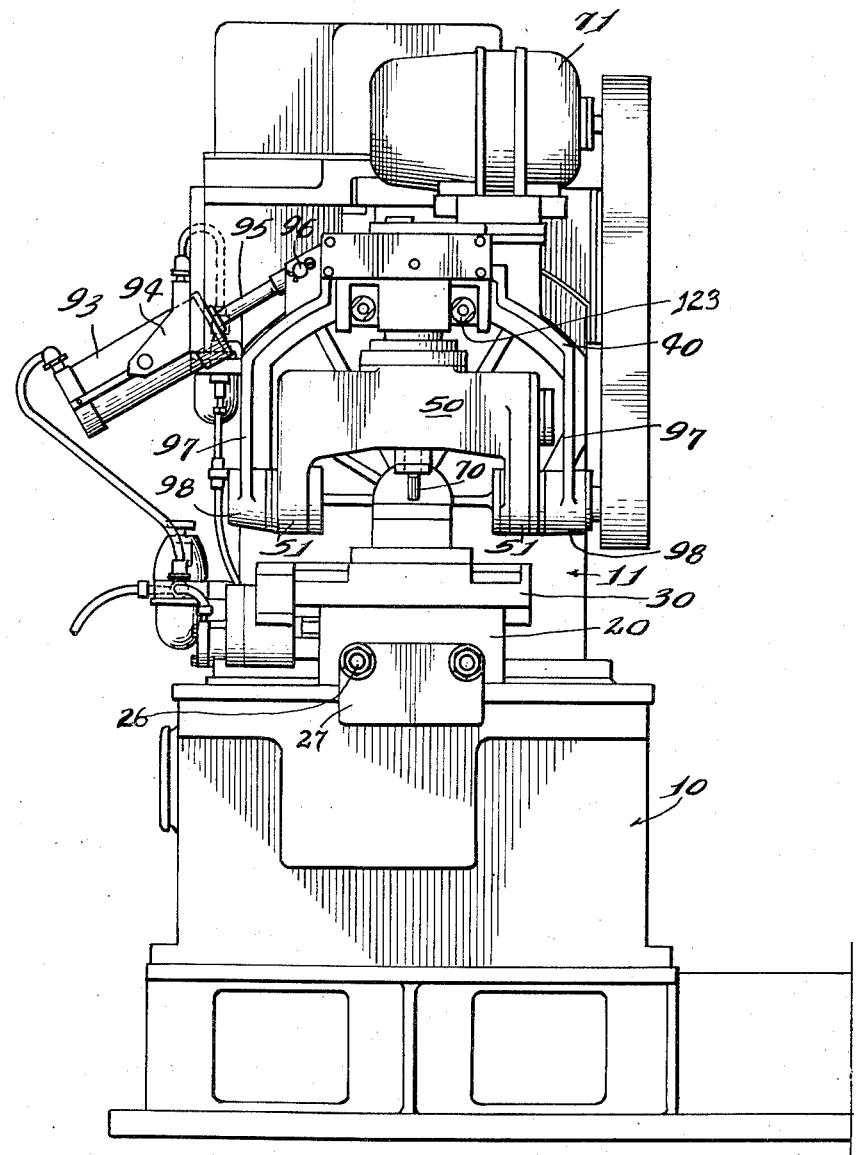

Inventors
Fred R. Swanson
Kenneth H. Hendry
By Schroeder, Merriam,
Hoffman + Brady
Atty's Inventors
Fred R. Swanson
Kenneth K. Hendry
Atty's

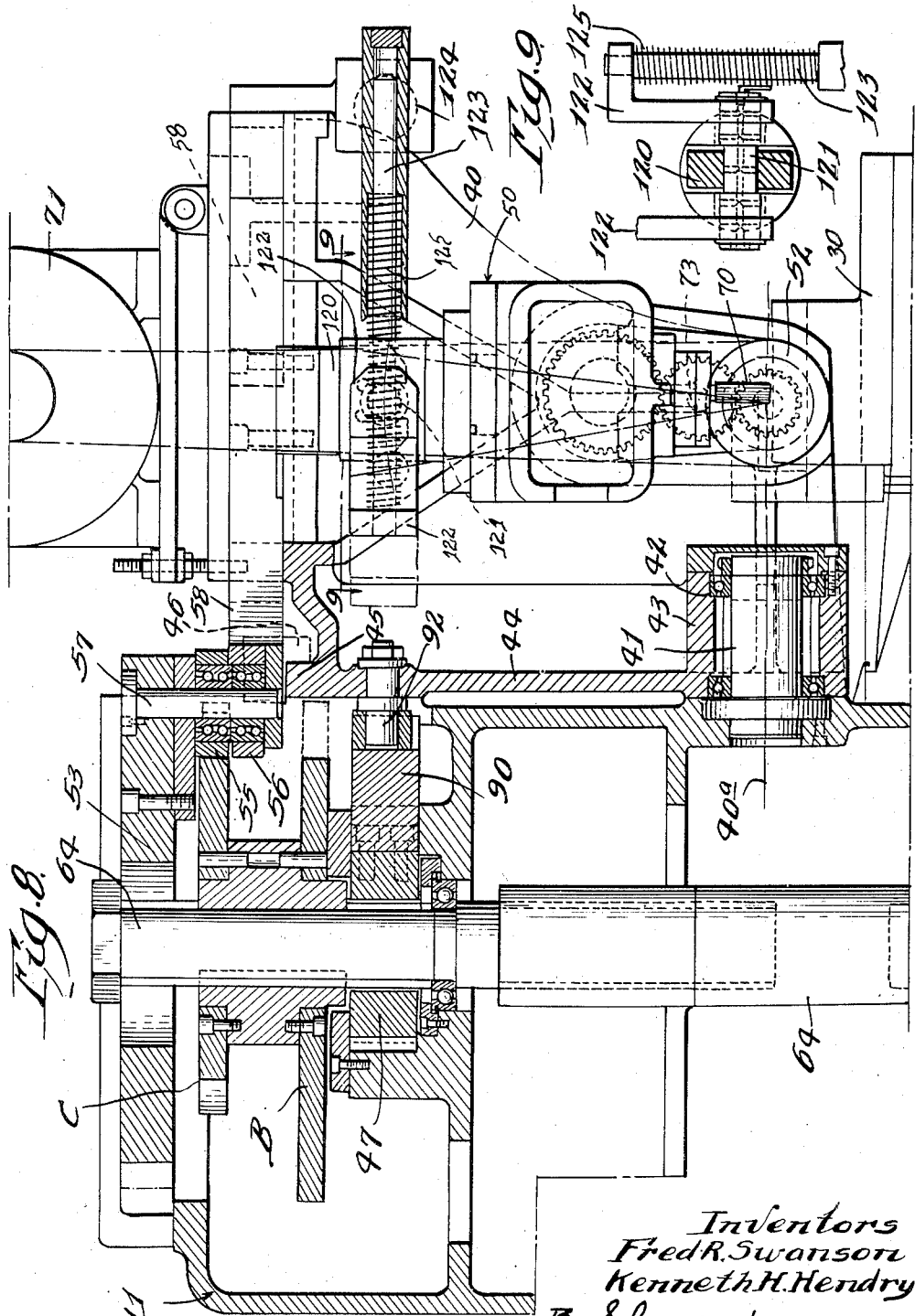

March 12, 1957  F. R. SWANSON ET AL  2,784,647
BUCKET MILLING MACHINE
Filed May 1, 1953  10 Sheets-Sheet 6
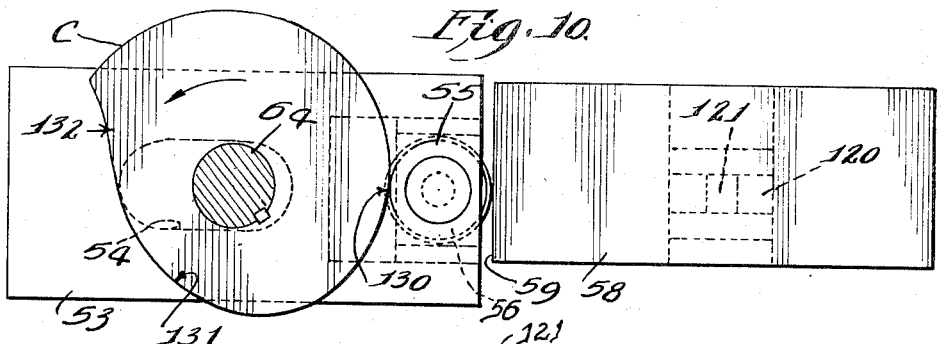
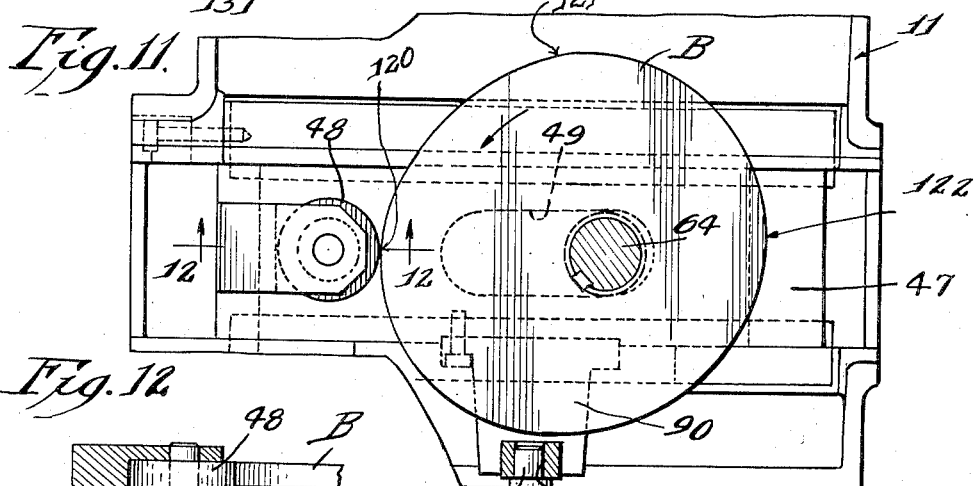
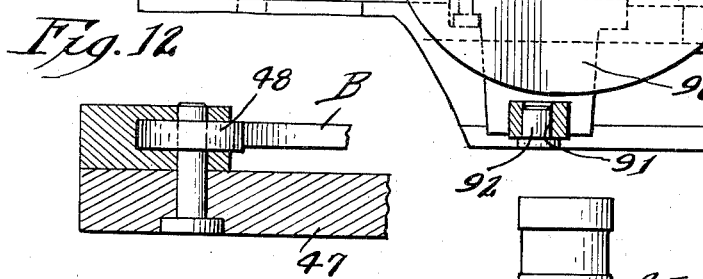
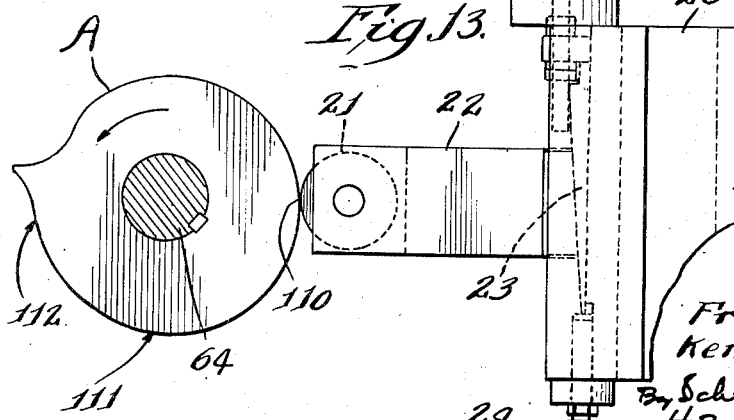
Inventors
Fred R. Swanson
Kenneth H. Hendry
By Schroeder, Merriam,
Hoffman & Brady
Att'ys

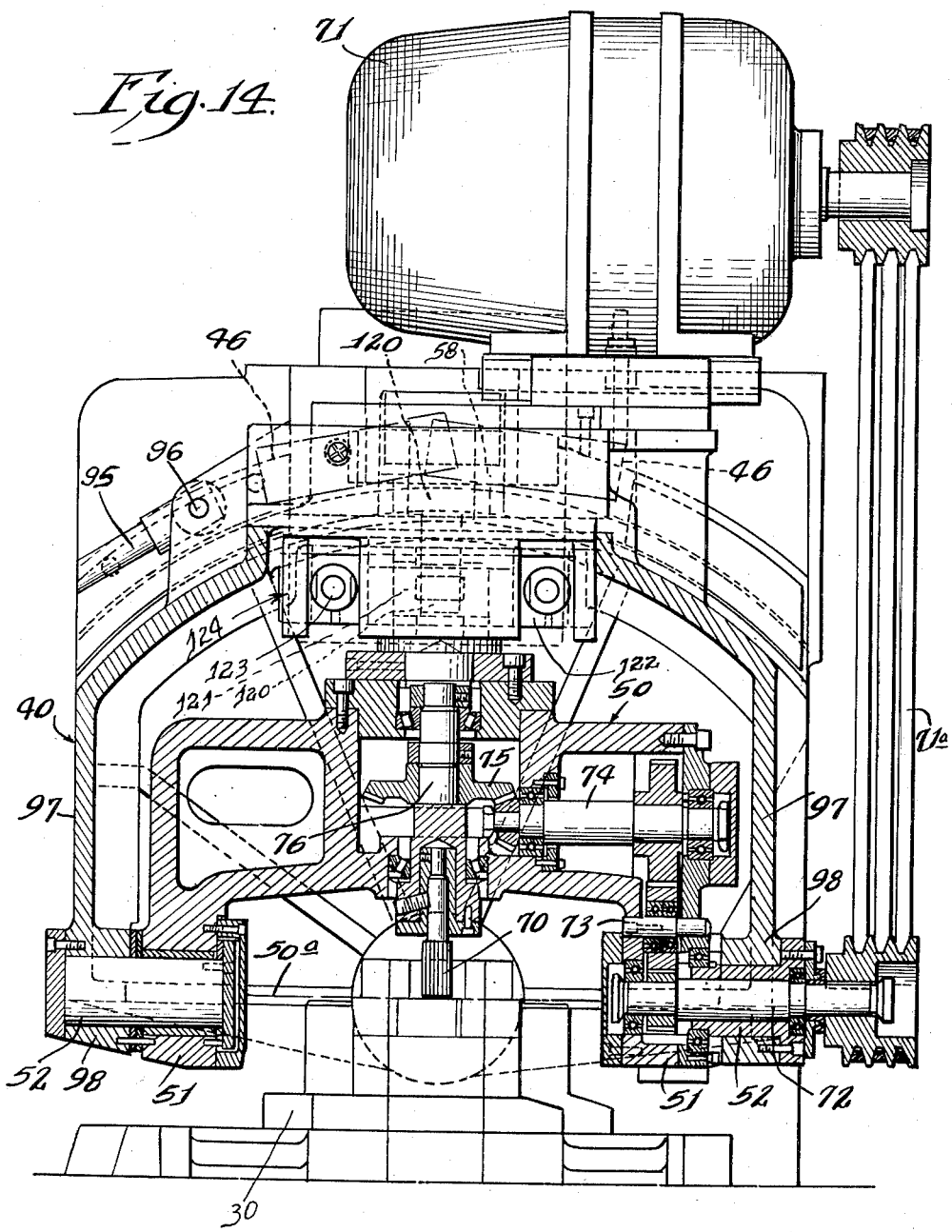

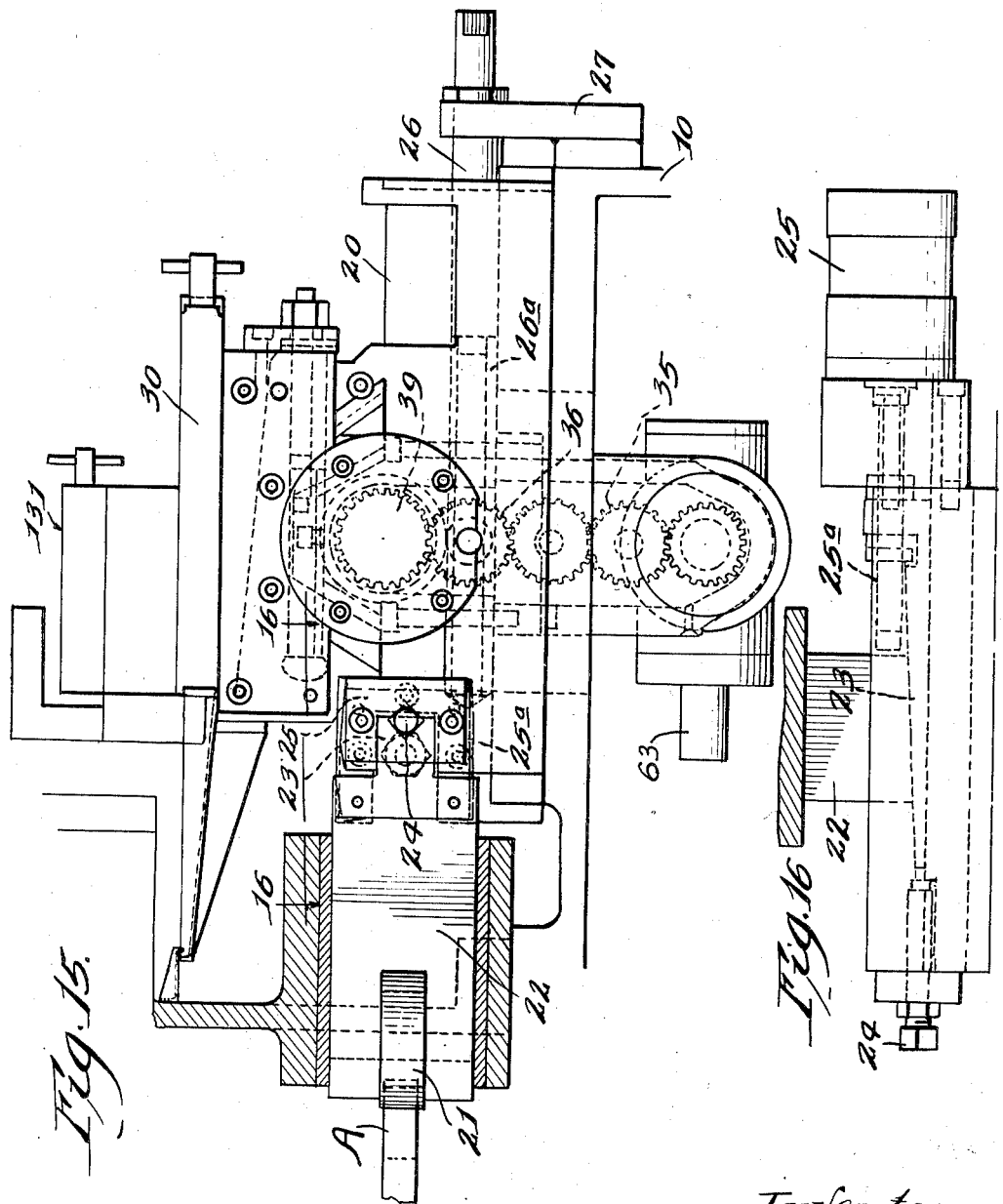

March 12, 1957 F. R. SWANSON ET AL 2,784,647
BUCKET MILLING MACHINE
Filed May 1, 1953 10 Sheets-Sheet 9
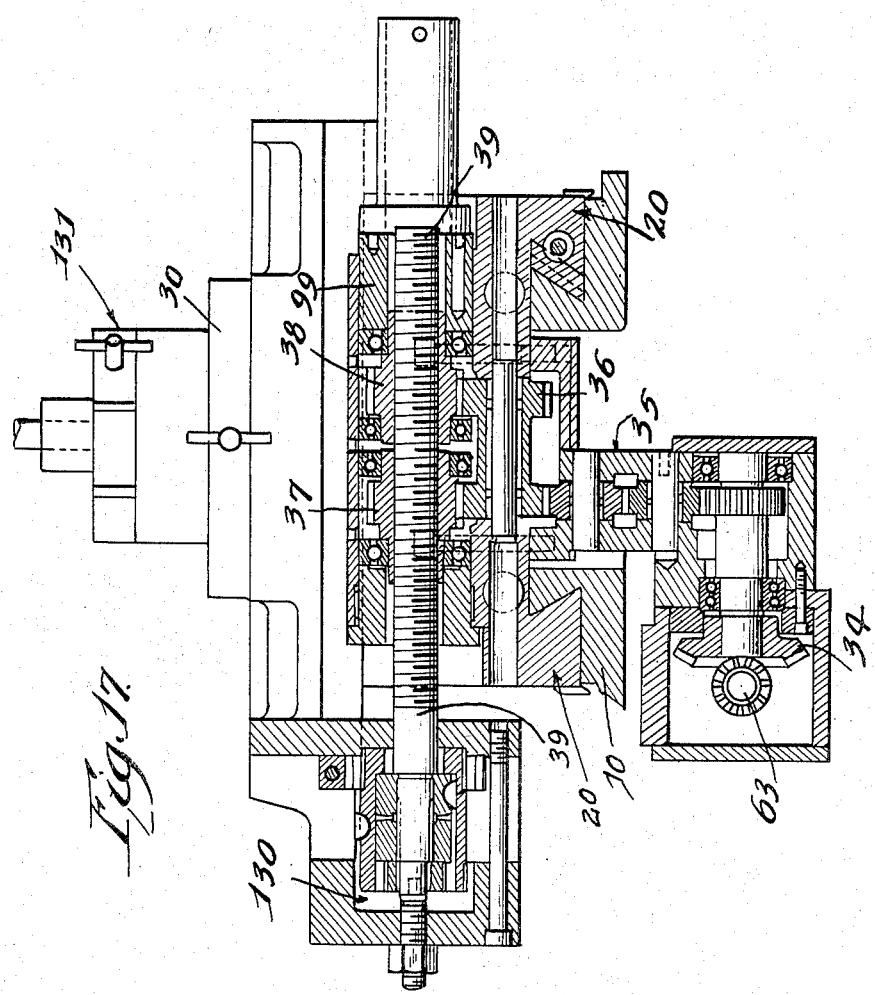
Inventors
Fred R. Swanson
Kenneth H. Hendry
By Schroeder, Merriam,
Hofgren & Brady Atty's Inventors
Fred R. Swanson
Kenneth H. Hendry
By Schroeder, Merriam,
Hofgren & Brady
Atty's

United States Patent Office 2,784,647
Patented Mar. 12, 1957

2,784,647

BUCKET MILLING MACHINE

Fred R. Swanson and Kenneth H. Hendry, Rockford, Ill., assignors to Sundstrand Machine Tool Co., a corporation of Illinois Application May 1, 1953, Serial No. 352,492

10 Claims. (Cl. 90—13)

This invention relates generally to machine tools and is concerned particularly with a type of milling machine in which the tool arbor is universally adjustable above a work position.

The principal object of the invention is to provide a new and improved milling machine of a type capable of cutting turbine bucket blades.

One object of the invention is to provide a new and improved milling machine for milling a workpiece to an irregularly curved surface having a straight line generatrix and providing the surface contour of a turbine bucket blade.

Another object is the provision of a milling machine of the character described having a compound work support and a universally movable tool support accurately driven in timed relation in order to mill high strength steels to close tolerances.

Another object of the invention is to provide a mechanism for moving the work supports and tool supports in one direction and then reversing the direction of movement without requiring a greater magnitude of force to effect the movement and without backlash.

A further object of the invention is the provision of a milling machine having a compound work support horizontally reciprocably movable, a first tool support mounted for oscillatory movement about a horizontal axis and a second tool support pivotally supported on the first so as to carry a cutting tool positioned above a workpiece, the tool supports providing for universal adjustment of the cutting tool relative to the workpiece and drive means for moving the tool supports and work supports in timed relation to perform a cutting operation.

Yet a further object is to provide a milling machine having work support and tool support movement control elements which may be replaced by similar elements to effect the cutting of other contours by the machine.

Other objects and advantages will become apparent from the following detailed description taken in connection with the accompanying drawings, in which:

Figure 1 is a side view of a workpiece holding magazine with finished workpieces therein;

Figure 2 is an end view of the left-hand side of Figure 1 looking toward the finished bucket blade and showing the outline of the workpiece prior to the milling operation;

Figure 3 is an end view like Figure 2 but looking toward the right-hand side of Figure 1;

Figure 4 is a front view of the magazine shown in Figure 1;

Figure 5 is a front elevational view of the milling machine embodying the principles of this invention;

Figure 8 is a fragmentary side elevational view of the machine partly in section to show the mechanism of the machine just above the portion of the machine shown in Figure 7;

Figure 9 is a fragmentary sectional view taken substantially along line 9—9 in Figure 8;

Figure 10 is a horizontal sectional view which is partially diagrammatic and showing the mechanism for moving the second tool support and is taken substantially along line 10—10 in Figure 6;

Figure 11 is a view similar to Figure 10 showing the driving mechanism for the first tool support and taken substantially along line 11—11 in Figure 6;

Figure 12 is a fragmentary sectional view taken substantially along line 12—12 in Figure 11;

Figure 13 is a view similar to Figures 10 and 11 showing the driving mechanism for the cross slide and taken substantially along line 13—13 in Figure 6;

Figure 14 is an enlarged fragmentary front elevational view partly in section and showing the driving mechanism for the cutting tool;

Figure 15 is an enlarged fragmentary side view of the cross slide and table showing the gear train for driving the table;

Figure 16 is a fragmentary view of the cross slide adjustment mechanism taken substantially along the plane indicated by the line 16—16;

Figure 17 is a fragmentary enlarged front elevational view partly in section of the cross slide and table showing the gear train and screw drive for the table;

Figure 6:
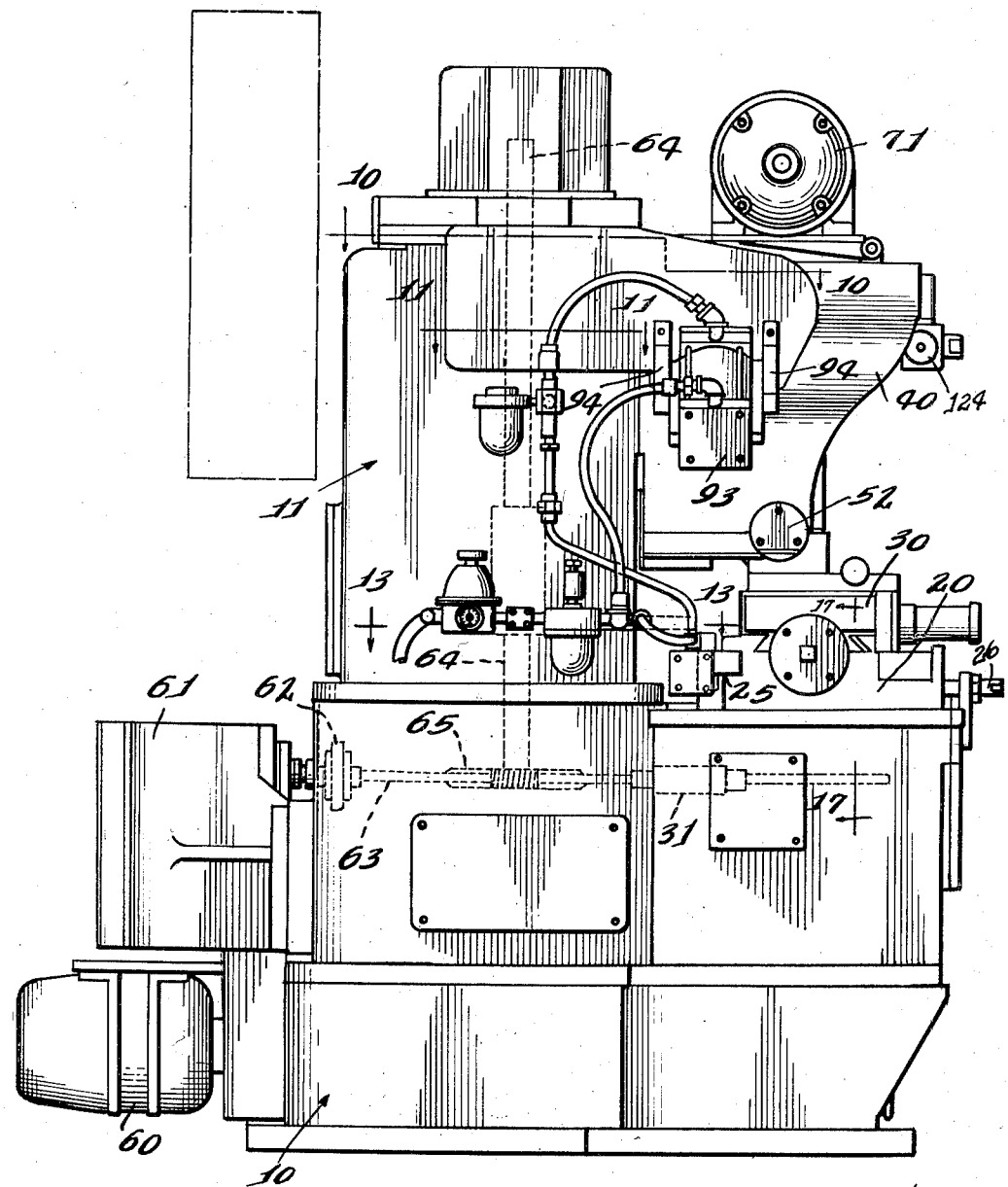
Figure 6 is a side elevational view of the machine illustrated in Figure 5. The view is looking toward the left-hand side from the front in Figure 5.

While there is shown in the drawings and described in detail herein certain structure embodying this invention, it is to be understood that the same is not limited to the specific form or application disclosed and that it is the intention to cover all modifications and alternative constructions falling within the scope of the invention as expressed in the claims.

The particular application of the present milling machines is for the purpose of cutting gas turbine bucket blades. The material of which the blades are formed is a very high nickel content steel. The machine works on a pre-milled stock making a single cutting pass on the inner contour of the blade and a similar single pass on the outer contour. The milling tool used is one of cylindrical form so that the bucket blade has a surface with a straight line generatrix.

In Figure 1, a pair of blades 100 are illustrated as formed on each end of a single piece of stock 101 which is secured in position within a magazine 102. The bucket blade 100 as shown is finished. In Figure 2, a dotted rectangular outline 103 indicates the shape of the pre-milled stock which is placed in the machine of this invention for the purpose of milling either the inner or outer contour of the blade. It will be noted by a comparison of Figures 2 and 3 that the magazine could be placed horizontally with one or the other of the bucket blades extending upwardly by merely turning the magazine over and each blade would be in the proper position for milling. In Figure 2, the front of the machine would be at the bottom of the drawing with the magazine horizontally supported and the blade 100 extending upwardly with the trailing edge 104 at the rear and the leading edge 105 at the front of the machine. In this position the blade would be properly located for the milling operation.

The front and side elevational views may be referred to for a general understanding of the movements of the various parts of the machine which are required to mill the contours of the bucket blade. In general the machine includes a base 10 and a column 11 upstanding from the rear portion of the base. On the front portion of the base 10 is mounted a cross slide 20 which is reciprocably movable horizontally and rearwardly. A table 30 is transversely movable on the cross slide and is arranged to carry the magazine 102 in which the workpiece is secured. The cross slide and table thus provide for feeding movement of the workpiece universally in a horizontal plane.

A cutting tool 70 is supported in a spindle head 50 which is referred to herein as the second tool support. This spindle head is pivotally mounted within a first tool support or cradle 40 which is mounted on the column for oscillatory movement about a horizontal axis 40a extending rearwardly from the work position. As viewed from the front in Figure 5, the whole tool supporting mechanism including the spindle head and cradle may oscillate about what would appear to be the lower end of the cutter 70 as a pivot. The cutter drive motor 71 is mounted on top of the cradle 40 and is carried along with the movements of the cradle. The spindle head can move frontwardly and rearwardly about its pivot axis 50a which also is on a line passing through the bottom of the cutter 70. In this manner the cutting tool may be given universal movement above the work position within a prescribed celestial angle. The movements of the cutter supports and the work supports are correlated to provide the proper sequence of movements to mill the inner or outer contours of the gas turbine bucket blade.

The work support and tool support driving mechanism is caused to operate in timed relation and is driven by drive motor 60 mounted on the rear of the base 10. Gear box 61 transmits the driving force through a coupling 62 to the table drive shaft 63. These parts may be seen in Figures 6 and 7. The table drive shaft 63 extends forwardly in the base to below the work supports. A cam shaft 64 is driven by means of a worm and wheel 65 from the table drive shaft 63. The cross slide and both tool supports 40 and 50 secure their movement from the cam shaft 64 as will more clearly appear in the description to follow.

In order to obtain a complete understanding of the mechanism of the milling machine as well as its operating sequences and to explain the machine to one skilled in the art, it is believed best to describe the details of the mechanism employed to impart movement to each of the work supports and tool supports. Each mechanism will be treated primarily by itself and will be followed by an explanation of the correlation and timed relation of the drive.

The cross slide 20 is moved by a cam and slide arrangement operating from the shaft 64. Cam A is shown in a side view of Figure 7 and in a horizontal diagrammatic view of Figure 13. The front of the machine is at the right-hand margin of Figure 13. The cam A which is keyed on the cam shaft 64 may operate to move a cam follower wheel 21 which is carried by a slide 22. This slide bears against an adjusting wedge 23 which is yieldingly urged against a stop pin 24 by a single acting air cylinder 25, the cylinder shaft 25a being secured to the wedge. The wedge is placed between the end of the slide 22 and the cross slide 20 so that adjustment of the screw 24 will permit accurate positioning of the cross slide relatively to the base of the machine. The particular mounting of this adjustment cylinder 25 is more clearly shown in Figures 15 and 16 which is an enlarged view of the arrangement from cam A to the cross slide 20. Studs 26 are supported by lugs 27 on the base of the machine for carrying springs yieldingly urging the cross slide 20 toward the cam A. The springs transfer their force to the cross slide which in turn bears against the wedge adjustment member and then against the slide 22, the cam follower wheel 21 to the cam A. The springs are chosen to have as small a differential of force between their contracted and expanded positions as practical and with the use of springs there is no difference in the force necessary to move the cross slide at the instant that the direction of movement is changed.

The first tool support or cradle 40 is mounted on the column 11. This cradle is intended to oscillate from side to side as the machine is viewed from the front. Figure 8 illustrates the particular means by which the cradle is supported on the column. A journal bearing 41 supports bearings 42 upon which the journal box 43, which is an integral part of the cradle, is mounted for pivotal movement. A portion of the cradle frame 44 extends upwardly along the column and has a boss portion 45 at its upper end which slides behind confining gibs 46. These confining gibs are shown in dotted outline in Figure 14 wherein two such gibs are shown. These gibs prevent the cradle from moving forwardly from the column structure. The cradle supports and carries the tool spindle and the motor for driving the cutting tool.

The first tool support or cradle is caused to oscillate about its bearing support by the action of cam B. This cam is shown diagrammatically in horizontal section in Figure 11 wherein the front of the machine is at the bottom of the drawing. A slide 47 passes just under the cam B and carries a cam follower wheel 48 in contact with the cam. The slide is provided with a central slot 49 which fits around the cam shaft 64 permitting the slide to move without interference from the cam shaft. As the cam shaft and cam B rotate, the slide is made to follow the cam by the action of an air cylinder acting directly on the cradle.

The particular connection between the slide 47 and the cradle is provided by a bracket 90 secured to the side of the slide and having a vertically extending way 91 in which a stud 92, which is secured to the cradle frame 44, is vertically movable. The slide moves in a linear horizontal path whereas the path of the stud 92 is arcuate about the bearing support of the cradle as a center. The force to maintain the slide against the cam is provided by an air cylinder 93 pivotally mounted by brackets 94 on the column. The air cylinder is single acting and the piston rod 95 is secured by pivot 96 to the cradle. The force applied tends to move the cradle about its pivot point to the right as viewed in Figure 5. In this manner, the slide 47 and follower wheel 48 are held against the cam B. There is practically no variance in the force necessary to move the cradle in the direction of the force applied by the air cylinder or against it. In this manner the movements of the cradle may be accurately and positively controlled.

The second tool support or spindle head is pivotally mounted within the cradle. In Figure 5, it will be noted that the cradle has depending arm portions 97 at either side supporting at their lower ends bearing bushings 98 in which the tool spindle 50 is pivotally supported. The tool spindle is seen generally in the views of Figures 5 and 8 and more specifically in Figure 14. Depending supports 51 of the spindle are pivotally supported on pivot pins 52 extending through the bearings 98 on the cradle and the bearings 51 of the spindle.

The pivotal movement of the spindle head relative to the cradle is controlled from cam C which is illustrated in vertical section in Figure 8 and in diagrammatic horizontal section in Figure 10. As viewed in Figure 10, the front of the machine is at the right-hand margin. A slide 53 is mounted above cam C for movement forwardly and rearwardly in the column structure. This slide has a slot 54 permitting movement without contacting the cam shaft 64. A pair of wheels 55 and 56 are mounted on a stud 57 carried by the slide 53. Wheel 55 bears against the cam C and is urged to follow the contour of that cam while wheel 56 bears against slide 58 which is mounted in the upper portion of the cradle 40. The end 59 of slide 58 is of sufficient width to bear against the wheel 56 throughout the range of oscillatory movement of the cradle.

The motion of the slide 58 is imparted to the spindle head 50 by means of an inverted U-shaped member 120 which may be seen in section in Figure 9 and in the dotted outlines of Figures 10 and 14. A short shaft 121 has flattened portions which are grasped between the legs of the U-shaped member 120 and which carry on their extremities a pair of L-shaped members 122 each holding the end of a stud 123 which is universally mounted at 124 on the front of the cradle. Compression springs 125 surround the studs 123 and bear inwardly through the short shaft 121 to slide 58 and then on back to cam C. Although the structure is flexible in that it permits the movement of the cradle transverse to the movement of the tool spindle and also accommodates the arcuate travel of the top of the spindle with relation to the horizontal path of slide 58, a constant force is supplied by the springs 125 and is carried through to the cam C. The springs are chosen to have as small a differential as possible between compressed and extended positions and with the use of the springs, there is little difference in force necessary to move the spindle head upon a reversal of the direction of movement.

The drive to the cutter tool is separate from the drive provided by the motor 60 for moving the work supports and tool supports. In Figure 14, the drive is shown in a section extending through the shafts of the gear train and drive. The drive motor 71 is mounted on the upper side of the cradle 40 and drives the tool spindle through belts 71a and a stub shaft 72 which extends through the pivots between the first and second tool supports. Spur gears respectively on the stub shaft 72, idler shaft 73 and second stub shaft 74 carry the drive to a ring gear 75 keyed to the spindle shaft 76 which carries the cutter 70. This drive is flexible in movement in the gear train on the shafts 72, 73 and 74 so that movement of the tool spindle relative to the cradle only requires an inconsequential speeding up or slowing of the cutter 70. The particular cutter drive motor 71 is a three horse power A. C. motor of 1,800 R. P. M.

Figure 7:
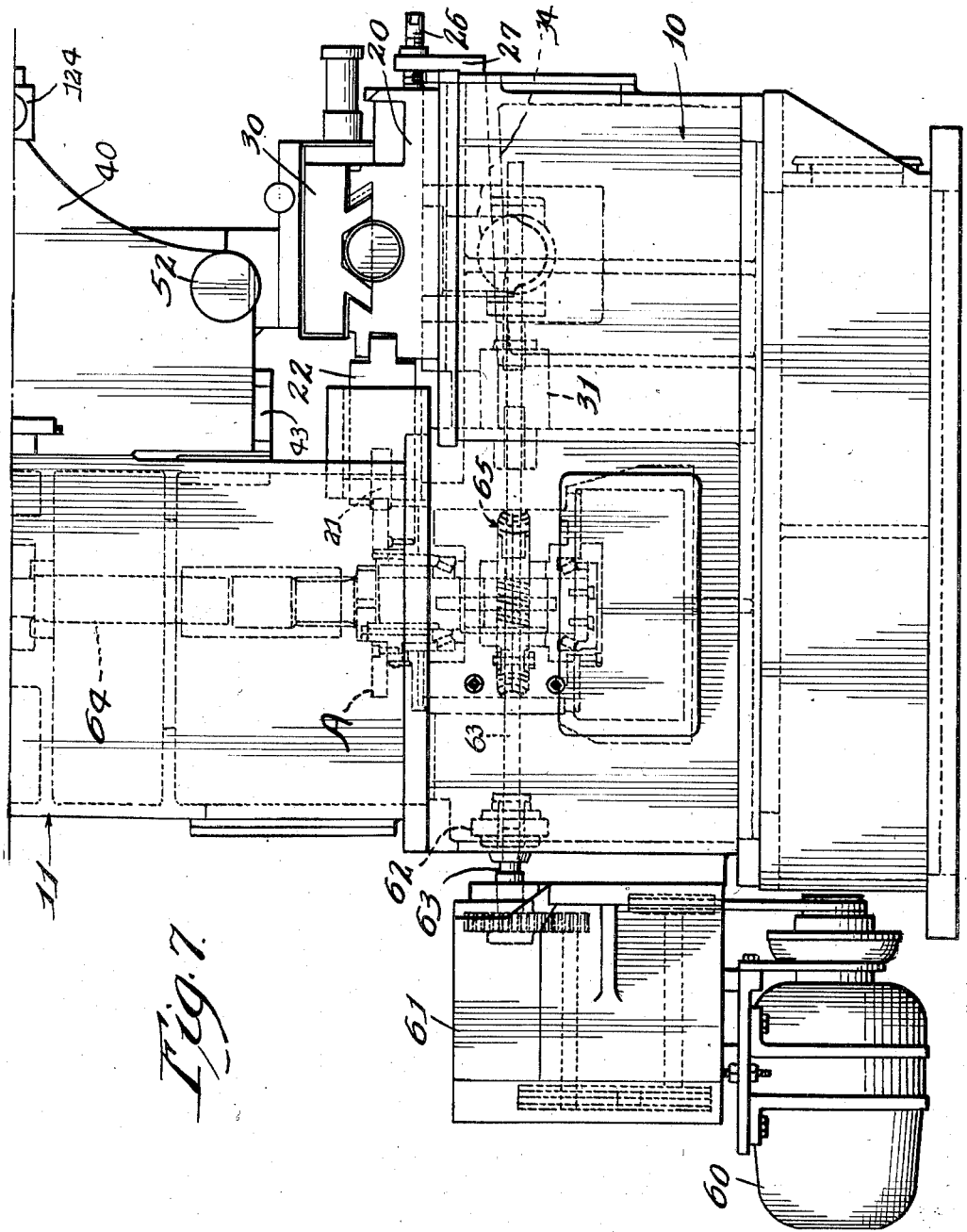
Figure 7 is an enlarged view of the lower portion of the machine showing the driving mechanism in dotted outline.

The table which is reciprocably mounted on the cross slide 20 is driven from the table drive shaft 63 which is powered by the motor 60. In Figures 6 and 7, a flexible coupling 31 is shown as provided on shaft 63 for the purpose of permitting the cross slide to move forwardly and rearwardly on the base without affecting the drive train to the table. Figures 15 to 17 specifically illustrate the gear train drive to the table.

The particular drive from shaft 63 is through a bevel gear 34 to a gear train 35 which carries the motion to a double idler gear 36. The double idler gear drives respectively, an internal threaded nut 37 and a similar nut 38 each of which ride on the threaded feed screw 39. This screw is held against rotation and the table is moved by the feed screw as the nuts 37 and 38 are turned by the table feed. These nuts are opposed to each other and are threaded on to the feed screw 39 to take up any play in the threads and are held in this position by the backing ring 99 to avoid backlash when reversing direction of the table feed.

An accurate table feed adjustment 130 is provided on the left-hand end of the feed screw 39 as seen in Figure 17. The gears of the gear train are carefully machined to as close tolerance as possible to avoid backlash in the table drive. Since the flexible coupling 31 is provided in the table shaft 63, the whole gear drive 35 is supported and moves with the cross slide 20. The usual types of workpiece holders 131 are provided on the table 30 for the purpose of securely holding the work magazine 102 in proper position in the milling machine and for the milling operation.

A workpiece to be formed into a bucket blade is held in position on the table and would appear from above as seen in Figure 2 with the front of the machine being at the bottom of the drawing. The milling cutter starts on the trailing edge 104 of the blade and proceeds over the inner contour of the blade ending at the leading edge 105. The cutter is tilted out of vertical position in a manner so that the bottom follows the root line 106 of the blade and top of the cutter follows the tip contour line 107. It will be noted that the cutter starting at the trailing edge 104 would be tilted rearwardly and to the right from a vertical position and from the root of the blade. The cutter proceeds to do the milling from the rough milled outline 103 at a speed to remove material at a rate of .003 inch chip per tooth.

The cams A, B and C described above control the movements of the cross slide, the first tool support and second support respectively. The cam shaft 64 upon which these cams are mounted also supports a switch wheel 110 on its upper end carrying dogs for operating the switches 111. The drive motor 60 is an accurately controlled variable speed direct current motor which is commercially available along with motor controls. The speed is varied by means of a cam plate 112 mounted on the upper end of cam shaft 64 which operates a solenoid device 113 as a potentiometer. These items are also commercially available as a control for the motor 60.

Figure 18:
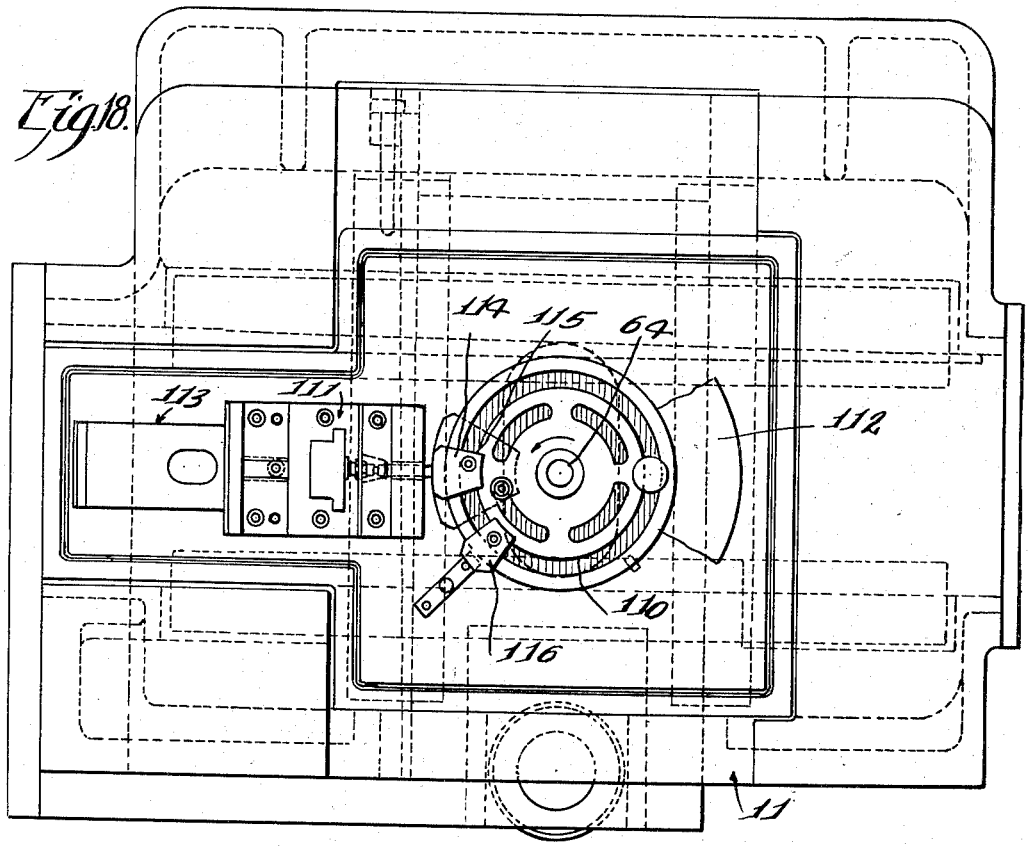
Figure 18 is a top plan view of the column portion of the machine with parts of the top removed to show the electric switch controls.
Figure 19:
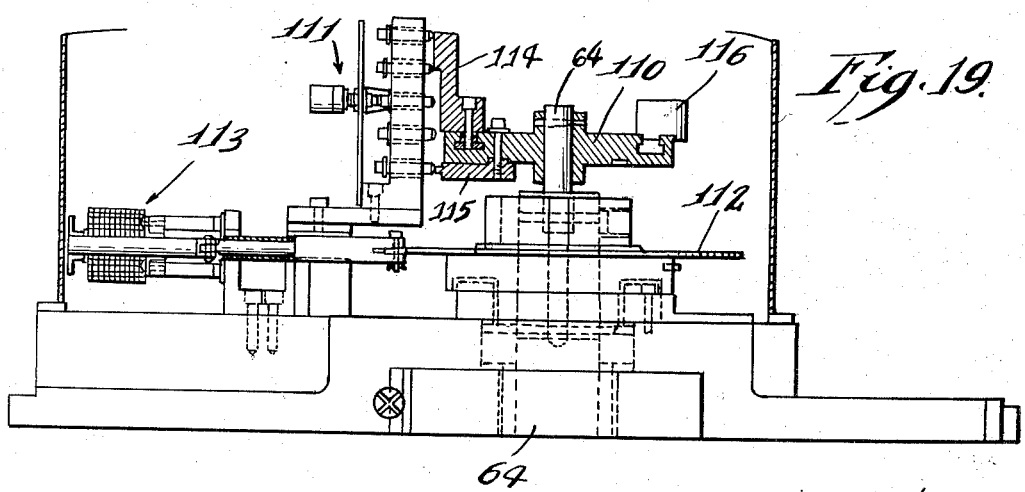
Figure 19 is a side elevational view with a side of the machine removed to show the switch controls illustrated in Figure 18. This view is partially diagrammatic and partly in section.

After the workpiece is in proper position on the work support table, the operation is started manually and thereafter the speed of movement is controlled by the motor controls. As viewed in Figure 18, the switch wheel 110 carries a neutral dog 114, a fast speed dog 115 and a reverse dog 116. After the cutter has been carried from the trailing edge 104 of the blade to the leading edge 105, the reverse dog 116 will actuate some of the switches 111 to reverse the motor 61 which will carry the parts back over the path through which they have just moved. In this manner the cutter may take out any material that was missed as a result of spring in the cutter or its shank. In Figure 19, dog 116 is shown out of place from its correct position in Figure 18 in order to clearly illustrate its shape.

In performing the milling operation to provide a finished turbine bucket blade the inside contour is separately milled from the outside contour of the blade. The machine disclosed in detail herein can be used for milling either contour by the simple expedient of changing the cams and table drive controls. The cams are of computed configuration considering tilt and position which must be assumed by the cutter and table in order to maintain an average .003 inch chip per tooth on the removal of the metal. On the inner contour illustrated, the cutter starts at the trailing edge of the blade in a position tilted rearwardly and to the right from the focal point of the tool, which is the intersection of the axes of movement of the tool support. The tool then proceeds through a vertical position to a position tilted to the left and forwardly from the focal point. While the cutter has been changed in position, the table has been fed to the left and rearwardly in timed relation to the cutter movements.

The cam profiles illustrated in Figures 10, 11 and 13 approximate the actual shape of the cams within the limits of variation attendant with reduction of size and rendition in making the draws. The cam followers are shown in the position they occupy at the start of the profile cutting operation and each cam is turned by the cam shaft 64 in the direction of the arrows on each cam. In this position, the cutter 70 is positioned at the trailing edge 104 of the blade properly tilted rearwardly and to the right for starting the cutting operation.

The various movements controlled by the cams A, B and C carry the cutter over the blank to cut the profile illustrated in Figures 1, 2 and 3. On Figure 13, cam A is positioned so that the follower 21 is against the cam at 110 which corresponds to the outermost position of the cross slide relative to the cam shaft. In other words, this point 110 is the point on the cam face having the greatest distance from the center of the cam shaft, that is, of those points on the cam surface that are contacted by the follower.

Cam B is positioned at the beginning of the cut so that the follower 48 is against cam B at 120. This positions the cutter at the trailing edge 104 of the blade.

Cam C is positioned at the beginning of the cut at 130 and progresses in the direction of the arrow on the cam in Figure 10. The forward and rearward tilt of the spindle head 50 properly positions the tool at the trailing edge 104 of the blade.

As the cutting progresses, the movements of the cams control the movements of the table and work supports to guide the cutter over the inner contour of the blade. At an intermediate point cam A will have an area 111 of its surface against the follower 21, cam B will have an area 121 against the follower 48 and cam C will have an area 131 against the follower 55, thus properly positioning the cutter on the intermediate or central portion of the blade, generally designated 109 in Figure 2.

At the finish of the cut across the inner contour of the blade, cam A will have an area 112 against the follower 21, cam B will have an area 122 against the follower 48, and cam C will have an area 132 against the follower 55, to properly position the cutter at the leading edge 105 of the blade.

The limit switches then reverse the direction of rotation of the driving motor and cam shaft and the cutter is traversed over the same path cutting out any metal not removed on the first pass because of slight springing in the cutting tool. After this operation, the magazine may be turned over to present a new blank blade for milling the inside contour thereof in the same fashion.

As previously described, a pair of turbine bucket blades are made from a single stock piece which is supported in the magazine 102. In Figure 1, the base 109 of the turbine blade is illustrated in the form it would take following the severance of the blades and the broaching of the base. The root of the blade is also given an additional milling cut on a root miller. This may be performed while the blade is still in the magazine 102. It is preferred to cut two blades from one piece of stock and the magazine is so designed that it may be up ended and present a blade in proper position on either side.

We claim:

1. A machine tool having, in combination, a base, a column uprising from the base, a cross slide movable horizontally and rearwardly on the base, a table movable transversely on the cross slide and arranged to carry a workpiece, means for moving the cross slide and table, a first tool support mounted on said column for oscillatory movement about a horizontal axis extending rearwardly from a point adjacent the work, a second tool support pivotally mounted on the first support for movement about a generally horizontal axis extending through said point adjacent the work and transverse to the first axis, means for oscillating the first support including a first rotatable cam member, a cam roller and slide mounted on said column for movement transversely to said horizontal axis about which the first support may oscillate, means connecting the slide and first support and means yieldingly urging said slide and cam roller in one direction against the first cam member, means for moving the second support relative to the first support including a second rotatable cam member, a second cam roller and slide mounted on said column for movement horizontally and rearwardly of the base, means connecting said slide and second tool support and means yieldingly urging said second slide and cam roller against said second cam member, a tool arbor mounted on an upright axis above the work position and adapted to carry a cutting tool having teeth positioned at the intersection of said axes of tool support movements, and means for driving said cutting tool.

2. In a machine tool having a base, a cross slide reciprocably mounted on the base, a table movable transversely on the cross slide and arranged to carry a workpiece, means for moving the cross slide and table, a first tool support mounted for oscillation about a horizontal axis extending rearwardly of the base, a second tool support pivotally mounted on the first tool support for movement about an axis intersecting and extending normal to said horizontal axis, a tool arbor mounted on the second support in generally upright position and arranged to carry a cutting tool, the intersection of said axes being substantially coincident with the cutting portion of the tool, mechanism for moving each of said tool supports conjointly and individually, each of said mechanisms including a cam member, a slide having a connection with the tool support to be moved and carrying a cam follower wheel for rolling contact with the cam member and means yieldingly urging the tool support in a direction opposed to movement away from the cam member to avoid back lash between the cam member and tool support, and means for driving said tool arbor to drive said cutting tool.

3. A machine tool having, in combination, a base, a column uprising from the base, a cross slide movable horizontally and rearwardly on the base, a table movable transversely on the cross slide and arranged to carry a workpiece, a first tool support mounted on said column for oscillatory movement about a horizontal axis extending rearwardly from a point adjacent the work, a second tool support pivotally mounted on the first support for movement about an axis extending through said point adjacent the work and normal to the first axis, a tool arbor mounted on the second support on an upright axis above the work position and arranged to carry a cutting tool, a cam shaft extending upright within said column, a cam member on said cam shaft for respectively moving each of said first tool support, said second tool support and said cross slide, mechanism extending between the respective tool supports and cross slide for translating movement of the contours of said cam members to the respective tool supports and cross slide as the cam shaft and cam members turn, driving mechanism for said table, motor drive means for driving the cam shaft and said table driving mechanism in timed relation to move the workpiece and cutting tool through predetermined paths, and means for driving said tool arbor to drive said cutting tool.

4. A machine tool having, in combination, a base, a column uprising from the base, a cross slide movable horizontally and rearwardly on the base, a table movable transversely on the cross slide and arranged to carry a workpiece, a first tool support mounted on said column for oscillatory movement about a horizontal axis extending rearwardly from a point adjacent the work, a second tool support pivotally mounted on the first support for movement about an axis extending through said point adjacent the work and normal to the first axis, a tool arbor mounted on the second support on an upright axis above the work position and arranged to carry a cutting tool, a motor drive means for moving said tool support and workpiece supports, a cam shaft extending upwardly within said column, a separate cam member on said cam shaft for respectively moving the cross slide, the first tool support and the second tool support, a table drive shaft geared to said cam shaft and having a gear train drive to said table, said motor drive means simultaneously driving said cam shaft and table drive shaft to correlate movements of said tool and workpiece supports and means for driving said tool arbor to drive said cutting tool.

5. In a machine tool having a base, a cross slide reciprocably mounted on the base, a table movable transversely on the cross slide and arranged to carry a workpiece, means for moving the cross slide and table, a first tool support mounted for oscillation about a horizontal axis extending rearwardly of the base, a second tool support pivotally mounted on the first tool support for movement about an axis intersecting and extending normal to said horizontal axis, a tool arbor mounted on the second support in generally upright position and arranged to carry a cutting tool, the intersection of said axes being substantially coincident with the cutting portion of the tool, means for separately and conjointly moving said tool supports in universal manner above the work position to carry the tool arbor sequentially through positions in which the arbor axis starts in a position tilted to the right and rearwardly from its focal point as viewed from the front of the base and is moved through a vertical position to a position tilted to the left and forwardly from said focal point, means for feeding said table rearwardly and to the left conjointly with said movements of the tool supports to form a turbine bucket blade from a workpiece carried by said table, and means for driving the cutting tool.

6. In a machine tool having a base, a cross slide reciprocably mounted on the base, a table movable transversely on the cross slide and arranged to carry a workpiece, means for moving the cross slide and table, a first tool support mounted for oscillation about a horizontal axis extending rearwardly of the base, a second tool support pivotally mounted on the first tool support for movement about an axis intersecting and extending normal to said horizontal axis, a tool arbor mounted on the second support in generally upright position and arranged to carry a cutting tool, the intersection of said axes being substantially coincident with the cutting portion of the tool, mechanism for moving each of said tool supports conjointly and individually, each of said mechanisms including a cam member, a slide having a connection with the tool support to be moved and carrying a cam follower wheel for rolling contact with the cam member, an air cylinder mounted on said base and yieldingly urging said first tool support in a direction to maintain said cam member and slide in contact, spring means mounted in the first tool support for yieldingly urging the second tool support toward its respective cam member and means for driving said tool arbor to drive said cutting tool.

7. A machine tool having, in combination, a table arranged to carry a workpiece, means including a cross slide movably mounting the table to provide feeding movement of the workpiece universally in a single plane, a first tool support mounted for oscillatory movement about an axis extending parallel to said single plane, a second tool support pivotally mounted on the first tool support for movement about an axis intersecting and extending normal to said first axis, a tool arbor mounted on said second support and adapted to carry a cutting tool with the cutting portion of the tool substantially coincident to the intersection of said axes, and means for moving said tool supports and table in timed relation including a driven cam shaft, a plurality of cam members on said shaft associated one with each of said tool supports and cross slide, and cam follower mechanisms extending between the cam members and the tool supports and cross slide for translating thereto movement as determined by the contours of the cam members.

8. A machine tool having, in combination, a table arranged to carry a workpiece, means including a cross slide movably mounting the table to provide feeding movement of the workpiece universally in a single plane, a first tool support, a second tool support movably mounted on said first tool support and adapted to carry a cutting tool, means mounting said tool supports to provide universal movement of the cutting tool about a point on said tool, and means for moving said tool supports and table in timed relation including a driven cam shaft, a plurality of cam members on said shaft associated one with each of said tool supports and cross slide, and cam follower mechanisms extending between the cam members and the tool supports and cross slide for translating thereto movement as determined by the contours of the cam members.

9. A machine tool having, in combination, a base, a column extending from the base, a cross slide movably mounted on the base, a table mounted on the cross slide for movement transversely thereof and adapted to carry a workpiece, a cradle pivotally mounted on the column for movement about a first axis, a spindle head pivotally mounted on said cradle for angular adjustment relative to the cradle and adapted to carry a cutting tool, a cam shaft extending within the column a distance sufficient to span the cross slide, cradle, and spindle head and having a plurality of cam members associated one with each of said cross slide, cradle, and spindle head and positioned substantially opposite their associated part, a motor for driving the table and cam shaft, a cam follower for each of the cams, and mechanical connections between the cam followers and their respective cross slide, cradle, and spindle head for translating thereto movements as determined by the contour of the cam members.

10. A machine tool comprising, in combination, a base, a column extending upwardly from the base, a cross slide mounted on the base for movement toward and away from the column, a table mounted on the cross slide for movement transversely thereof, a cradle, a first means pivotally mounting the cradle on the column to provide a portion extended upwardly along the column formed with depending arms, a spindle head, a second means pivotally mounting the spindle head in said arms for angular movement with respect to the cradle, said first and second means having their axes lying in a common plane, a vertically extending rotatable cam shaft in said column having a plurality of vertically spaced cam members associated one with each of said cross slide, cradle, and spindle head for controlling movement thereof, a first slide operatively connected to the cross slide and having a cam follower engageable with one of said cam members positioned at the level of the cross slide, a second slide operatively connected to the upwardly extended portion of the cradle and having a cam follower engageable with another of said cam members positioned substantially at the level of the second slide, a third slide operatively connected to the spindle head and having a cam follower engageable with a third one of said cam members, and means for driving said table and cam shaft in timed relation.

References Cited in the file of this patent

UNITED STATES PATENTS

| | | |
|---|---|---|
| 2,341,194 | Schwartz et al. | Feb. 8, 1944 |
| 2,424,031 | Heer | July 15, 1947 |
| 2,674,160 | Martellotti | Apr. 6, 1954 |

FOREIGN PATENTS

| | | |
|---|---|---|
| 650,279 | Great Britain | Feb. 21, 1951 |